(12) United States Patent
Ganapathy

(10) Patent No.: US 7,549,152 B2
(45) Date of Patent: *Jun. 16, 2009

(54) METHOD AND SYSTEM FOR MAINTAINING BUFFER REGISTRATIONS IN A SYSTEM AREA NETWORK

(75) Inventor: Narayanan Ganapathy, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 271 days.

This patent is subject to a terminal disclaimer.

(21) Appl. No.: 11/441,984

(22) Filed: May 26, 2006

(65) Prior Publication Data

US 2006/0230157 A1 Oct. 12, 2006

Related U.S. Application Data

(63) Continuation of application No. 09/930,065, filed on Aug. 15, 2001, now Pat. No. 7,055,152.

(51) Int. Cl.
*G06F 3/00* (2006.01)
*G06F 9/44* (2006.01)
*G06F 9/46* (2006.01)
*G06F 13/00* (2006.01)

(52) U.S. Cl. .................... 719/313; 709/234
(58) Field of Classification Search ......... 711/100–173; 718/104; 709/228–234; 719/310–320, 328–330, 719/313

See application file for complete search history.

(56) References Cited

U.S. PATENT DOCUMENTS

| | | | | |
|---|---|---|---|---|
| 5,675,793 A | * | 10/1997 | Crick et al. | 713/1 |
| 5,961,606 A | * | 10/1999 | Talluri et al. | 709/234 |
| 6,125,434 A | * | 9/2000 | Willard et al. | 711/170 |
| 6,535,929 B1 | * | 3/2003 | Provino et al. | 719/321 |

OTHER PUBLICATIONS

Compaq et al., Virtual Interface Architecture Specification—Version 1.0, Compaq Computer Corp, Intel Corporation, Microsoft Corporation, Dec. 16, 1997, pp. 1-83.*

Dunning et al, The Virtual Interface Architecture, IEEE Micro, Mar./Apr. 1998, pp. 66-75.*

\* cited by examiner

*Primary Examiner*—Meng-Ai An
*Assistant Examiner*—Diem K Cao
(74) *Attorney, Agent, or Firm*—Merchant & Gould, P.C.

(57) ABSTRACT

A system and method of managing memory in a system area network that registers buffers for use by an application program to access hardware adapters. The system and method maintains a list of registered buffers so that the application program may perform more than one request using the buffer. De-registration of a buffer occurs only upon an explicit de-registration or free command or upon the receipt of a request to modify the properties of the buffer, or in some cases, following the use of garbage collection techniques.

6 Claims, 6 Drawing Sheets

METHOD AND SYSTEM FOR MAINTAINING BUFFER REGISTRATIONS IN A SYSTEM AREA NETWORK

CROSS-REFERENCE TO RELATED APPLICATIONS

This application is a continuation of U.S. patent application Ser. No. 09/930,065 filed Aug. 15, 2001, currently pending. U.S. patent application Ser. No. 09/930,065 is hereby incorporated by reference in its entirety as if set forth herein in full.

TECHNICAL FIELD

The present invention relates to methods and systems for the managing memory allocations in a system area network (SAN).

BACKGROUND OF THE INVENTION

System Area Networks (SANs) provide significant benefits as compared to other network configurations. Typical SANs are highly localized having a server computer system and at least one client computer system that communicates with the server computer system. A primary element that differentiates a SAN from other network configurations such as a Local Area Network or a Wide Area Network is that the communication protocol is designed particularly for the SAN. Indeed, typical SAN protocols take advantage of the relatively small size of the SAN and/or the security involved with such a system, to therefore implement the communication protocol in hardware to capitalize on the speed of the system.

By recognizing that each of the clients is trusted and by the fact that communication distances are small and usually comprise high speed, low error communication lines, a typical SAN protocol can be simplified such that the overall performance of the system is relatively improved over other network systems. One particular protocol that has been developed is known as Infiniband, which allows applications running on a computer connected to the SAN to send messages on the fabric by directly accessing the hardware without going through the operating system layer. The hardware is called an HCA or host channel adapter. By doing so, an executing application can avoid operating system calls when accessing the HCA directly, which consequently improves performance of the system.

Prior to directly accessing the HCA, however, the application must register a buffer of memory. This registration involves translating a virtual memory address to a physical memory address and putting the information into the HCA. Without the registration process, the HCA does not know where in physical memory the corresponding data resides. Following the registration process, the application issues an I/O request on the buffer, the request is performed and then the buffer is de-registered. Since the layer that accesses the hardware does not own the buffers, i.e., the application owns the buffers, the hardware has to deregister the buffer immediately. This means for every I/O operation, we have to perform the registration/de-registration process steps which significantly impacts and impairs performance.

It is with respect to these considerations and others that the present invention has been made.

SUMMARY OF THE INVENTION

The present invention relates to a system that provides both the ability to directly access host channel adapters through the registration process and the ability to maintain a list of registered buffers so that future I/O requests may be performed using existing, registered buffers. Thus, the system and method of the present invention does not require the automatic de-registration of a registered buffer following an I/O request. Instead, the present invention de-registers a buffer only upon an explicit de-registration or free command or upon the receipt of a request to modify the properties of the buffer.

In accordance with aspects of the present invention, a system and method is provided that manages memory in a distributed network, such as a system area network, having a client application program and a host channel adapter. In this embodiment the method comprises the acts of registering a buffer of memory related to the host channel adapter, allowing the application program access to the registered buffer to perform a request, and maintaining the buffer as registered to allow the application program to perform another request using the registered buffer. Thus, the buffer is not de-registered immediately following the first request. The act of maintaining the buffer as registered may entail maintaining a list of registered buffers, such as in a lookup table.

In accordance with other aspects of the invention, the system and method may further involve receiving a request to free the buffer and then de-registering the buffer so that the application program cannot use the buffer to perform a request. Thus, the cache or memory allocated to the registered-buffer list can be simplified once buffer use is complete. The request to free the buffer may be a request to change the properties of the buffer, as such, a change may materially alter the characteristics of the buffer such that the first buffer should be de-registered and a second buffer be registered in its place.

In accordance with yet other aspects of the present invention, the system and method of maintaining a list of registered buffers may be implemented as part of an operating system, as opposed to an application program. Further, the list may be maintained through the use of garbage collection techniques to remove buffers that are not in use but have not been explicitly removed by the application programs that originally created those buffers.

The invention may be implemented as a computer process, a computing system or as an article of manufacture such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

A more complete appreciation of the present invention and its improvements can be obtained by reference to the accompanying drawings, which are briefly summarized below, and to the following detailed description of presently preferred embodiments of the invention, and to the appended claims.

DETAILED DESCRIPTION OF THE INVENTION

Figure 1:
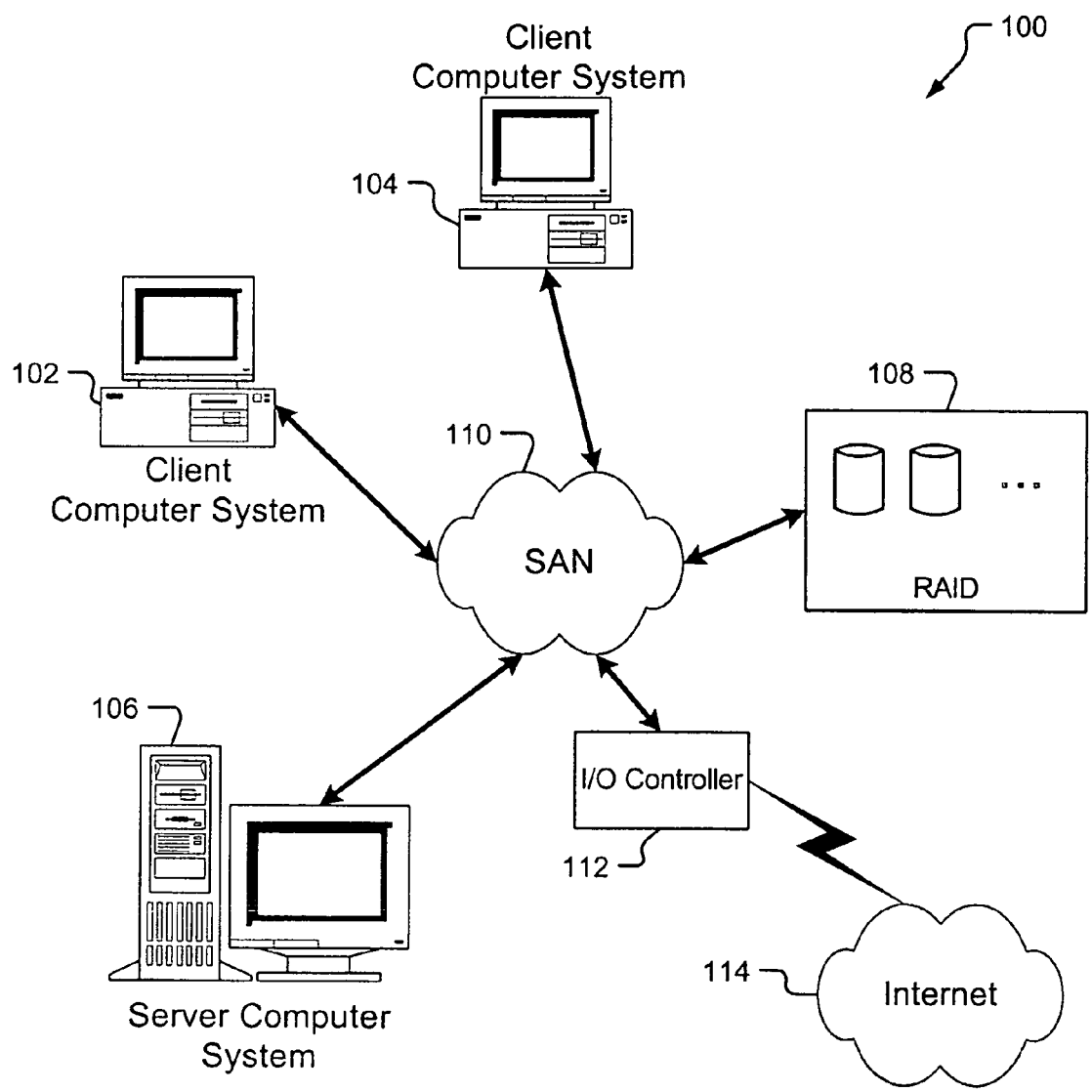
FIG. 1 illustrates a system area network environment incorporating a memory management system according to aspects of the present invention.

A distributed environment 100 incorporating aspects of the present invention is shown in FIG. 1. The environment 100 has at least one client computer system 102 and potentially other client computer systems such as 104. The environment 100 further includes at least one server computer system such as server computer system 106. Additionally, the environment may include a memory system, such as RAID (Redundant Array of Independent Disks) system 108. The client computer systems such as 102 and 104, communicate with the server computer system 106, and the memory system 108 over a network configuration such as SAN 110. SAN 110 is a system area network, such as FiberChannel, InfiniBand, among others, that provides communication capabilities to the various components, such as client systems 102 and 104. Additionally, the environment 100 may include an I/O controller 112 that provides an interface connection to other networks, such as the Internet 114.

In an embodiment of the invention the protocol used through the system area network provides for high-speed communication between the server computer system, client computer systems, and the memory system 108. The various systems 102, 104, 106, and 108 are considered trusted systems within the environment 100. These trusted systems, therefore, communicate in a substantially secure manner. Communicating in a substantially secure manner provides for the reduced error correction and security clearance communications as would be required in a wide area network, such as over the Internet 114.

Given the secure protocol used in SAN 110, client computer systems, such as 102, may access hardware components, such as memory system 108, through a process of registration of buffers in memory, which are mapped to hardware resources such as registers in a channel adapter. The direct access reduces the number of system calls that would otherwise be necessary to perform various functions. Additionally, in an embodiment of the invention, a list of registered buffers is maintained to reduce the overhead associated with registering and deregistering the buffers in memory, as discussed below.

In an embodiment, the client computer system, such as system 102 maintains the list. In alternative embodiments, the system area network, through the server computer system 106, maintains a cache of information related to the registered buffers and, thus, maintains the list of these buffers. The list is stored in a registration look-up table, which is checked by the system upon each memory request. If a memory request relates to a buffer that has recently been registered, and is in the registration look-up table, no further registration is necessary. In such a case, the memory request is carried out without any operating system calls and thereby improves performance of the system. If the buffer is not in the registration table, then the registration process occurs through the requisite system calls.

Importantly, under the present invention once a buffer has been registered that buffer is not deregistered until the application issues a command to either free the buffer or to change the permission attributes for the buffer. Therefore, a registered buffer may be accessed numerous times before becoming deregistered.

A computer system 200 that may be used to perform the process of creating a cache of registered buffers, storing and/or maintaining the cache of buffers or accessing registered buffers according to the present invention is shown in FIG. 1. The system 200 has at least one processor 202 and a memory 204. The processor 202 uses memory 204, wherein the memory 204 may store cached information.

Figure 2:
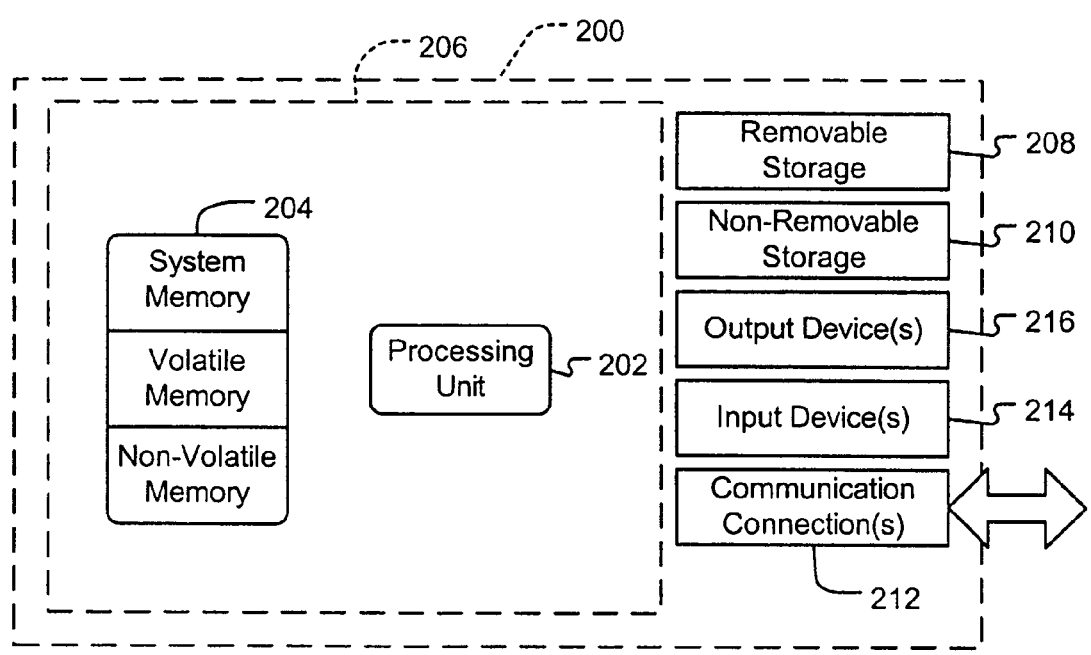
FIG. 2 illustrates a computer system incorporating a memory management system of the present invention.

In its most basic configuration, computing system 200 is illustrated in FIG. 2 by dashed line 206. Additionally, system 200 may also include additional storage (removable and/or non-removable) including, but not limited to, magnetic or optical disks or tape. Such additional storage is illustrated in FIG. 2 by removable storage 208 and non-removable storage 210. Computer storage media includes volatile and nonvolatile, removable and non-removable media implemented in any method or technology for storage of information such as computer readable instructions, data structures, program modules or other data. Memory 204, removable storage 208 and non-removable storage 210 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by system 200. Any such computer storage media may be part of system 200. Depending on the configuration and type of computing device, memory 204 may be volatile, non-volatile or some combination of the two.

System 200 may also contain communications connection(s) 212 that allow the device to communicate with other devices. Communications connection(s) 212 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

System 200 may also have input device(s) 214 such as keyboard, mouse, pen, voice input device, touch input device, etc. Output device(s) 216 such as a display, speakers, printer, etc. may also be included. All these devices are well known in the art and need not be discussed at length here.

Computer system 200 typically includes at least some form of computer readable media. Computer readable media can be any available media that can be accessed by system 200. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by system 200. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

Figure 3:
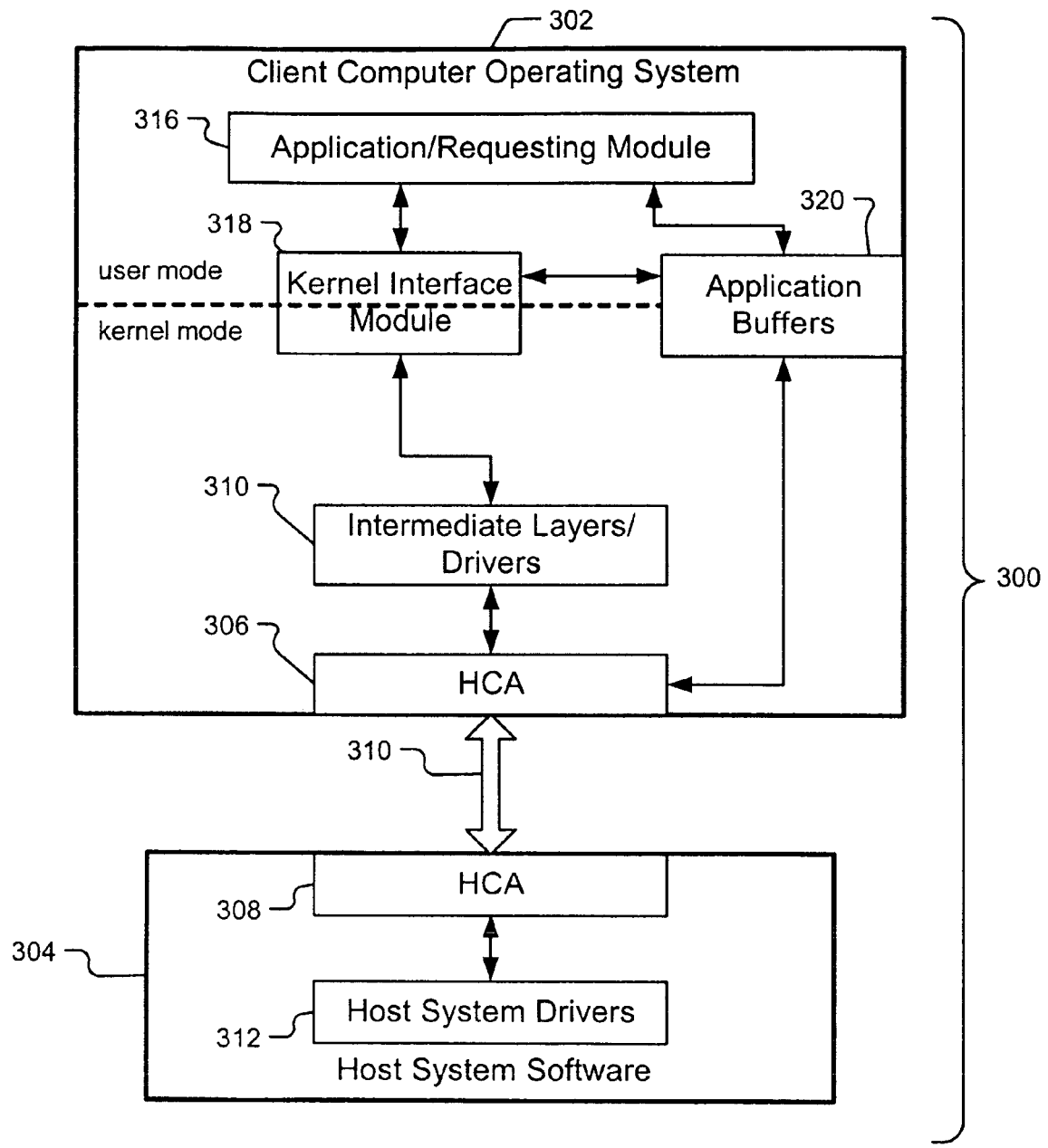
FIG. 3 illustrates functional software components of the present invention, including the database management system incorporated in the system shown in FIG. 1.

FIG. 3 illustrates a suitable software environment 300 of functional software components in which the present invention may be implemented. The software environment 300 is only one example of a suitable environment and is not intended to suggest any limitation as to the scope of use or functionality of the invention. Other well-known environments, and/or configurations that may be suitable for use with the invention may implement the present invention.

In the embodiment shown in FIG. 3, the software environment 300 comprises the client computer system software 302, and a host system software 304. The client computer system software 302 communicates with a host or server computer system software through the use of hardware channel adapter or HCA 306. The HCA 306 of the client computer system communicates with HCA 308 of the host computer system via the SAN fabric 310 as shown in FIG. 3. The host system software 304 may be associated with a server computer such as server computer system 106 or RAID system 108 or any other system in the SAN environment depicted in FIG. 1.

In order to access the HCAs 306 and 308, driver module 310 and 312 are used to provide communication. The driver 310 may be accessed by the client system software through various layers of abstraction, such a file systems and possibly others. Additionally, within the host computer system software there is a driver module 312 that provides the communication between the host HCA 308 and another host computer system software or hardware.

The client computer system software 302 has an operating system that is manages the overall functions, hardware and software, for the client computer system. Thus, the operating system is the system upon which other modules run, such as the drivers and intermediate levels of processing 310 and other applications, such as application 316. In the embodiment shown in FIG. 3 however, application 316 requires access to the HCA 306 or other HCAs, such as HCA 308 in order to operate. Thus, the application 316 is also referred to as a request module since it requests the use of or access to the other resources 306 via the SAN.

Within the client computer system, a kernel operating system controls the use of the systems processing unit, such as unit 202 shown in FIG. 2. The kernel operating system essentially manages the functions that the processing unit performs and in what order. The kernel operating system operates in at least two modes, a user or non-privileged mode and a kernel or privileged mode, as shown in FIG. 3. While operating in user mode, applications, such as application 316 operate, using the processor to perform various functions. However, the application is limited in that initially the application cannot directly access the HCA 306 from the user mode. Instead, while in user mode, the application must make a request, i.e., a system call, of the kernel interface module to allow access to HCA 306.

As shown in FIG. 3, the application communicates a request to a kernel interface module 318 that receives the request, switches the mode of the processor from user mode to kernel mode and then communicates the request onto the appropriate handler, such as client processor handler (not shown) or the network system handler, e.g., the HCA 306, or some other networking software.

The HCA 306 communicates the request to the HCA 308 of the host computer system 304. The host computer system communicates the request to a file system or some other middle layer abstraction (not shown) that manages files and other objects. The file system or other middle layer communicates with device driver 312. In turn the device driver interfaces with the hardware adapter 308. As shown in FIG. 3, the adapter 308 may be considered to be at the hardware level.

Typically, the request is considered an "I/O request" which means "input" or "output" request. Input and output requests typically relate to the transfer of bits to or from hardware registers so that a particular hardware function may occur. The hardware functions may include anything from memory reads or writes, printing requests, display requests, among others. The kernel operating system, while in kernel mode, evaluates the I/O request and provides for the setting of bits in the requested register. Having a separation between kernel mode and user mode thus provides a level of security between the user applications and the hardware resources. That is the kernel is trusted code and no security checks are necessary.

In an embodiment, the hardware registers may be exposed directly to the application operating in user mode, as indicated by buffer 320. This concept departs from the classic model since the layers of layers of protection/separation between the user mode application and the hardware registers are missing. In this case, the SAN protocol is written in hardware and thus the host channel adapter may expose some of the hardware registers directly to the application.

In order to have various registers exposed directly to the application program performs a system call to the kernel interface module. The kernel interface module registers a work request queue or queue in memory associated with the application. Additionally, the kernel interface module then provides the application program with access to the buffer. Thus, the application program can then access the work request queue, which relates directly to the registers of the host channel adapter, without going through the kernel interface module.

In an example, an embodiment may employ a protocol that operates and communicates via I/O requests by using queue pairs that are implemented by mapping hardware registers in user mode. A queue-pair contains both a send queue and a receive queue and communication channels between systems are established by connecting their queue pairs. In this case, a send queue may include an end point, a buffer and a length. Similarly, the receive queue may also include an end point, buffer and length. In one case the end point is an address descriptor, a queue-pair number, or in another embodiment, the end point is a socket. Once the queue pairs are set, the hardware performs the transfer of information.

In order to register the buffer, a system call to the kernel interface module is invoked to set up the end point and to register the buffer. The kernel interface module may make sure the buffer is locked or otherwise cannot be swapped or modified. The interface module may also map virtual memory addresses to actual memory addresses. Thus, once a buffer is registered, the application performs a send or receive (i.e., an I/O request) on that buffer and since the buffer is registered all further operations are taken care of automatically to carry out the transfer, e.g., translation from virtual addresses to physical addresses, transfer of information, etc. may occur automatically.

Once registered, application buffers 320 may be specified by the application 316 and the HCA understands such a specification since the operating system, such as through the kernel interface module 318, put the information into the HCA as part of the registration process. The buffers 320 map virtual memory to the actual or physical memory address in the system. Therefore, in this configuration, once a buffer is registered and the address space 320 is assigned, then the application 316 can make one or more I/O requests to the buffer. In essence, the buffers 320 are application buffers that are registered with the HCA so that the HCA can understand the physical address to access when the user mode application 316 directly tells the HCA to use the buffer based on a virtual address.

In an embodiment of the invention, when a request is made, the kernel interface module 318 performs a function of checking to see if the requested buffer is registered. In essence, the kernel interface module 318 maintains a list of registered buffers. If the kernel interface module 318 determines that the requested buffer is already registered then the application request is allowed to be processed directly. However, if the kernel interface module determines that the buffer is not registered, then the module 318 registers the buffer for the application. Additionally, should the module 318 receive a request to either free the buffer or to modify the properties of the buffer, such as the address space or the size of the buffer, then the kernel de-registers the buffer. However, until the application sends such a request, the buffer may remain registered so that the application can use it without re-registering that buffer.

Figure 4:
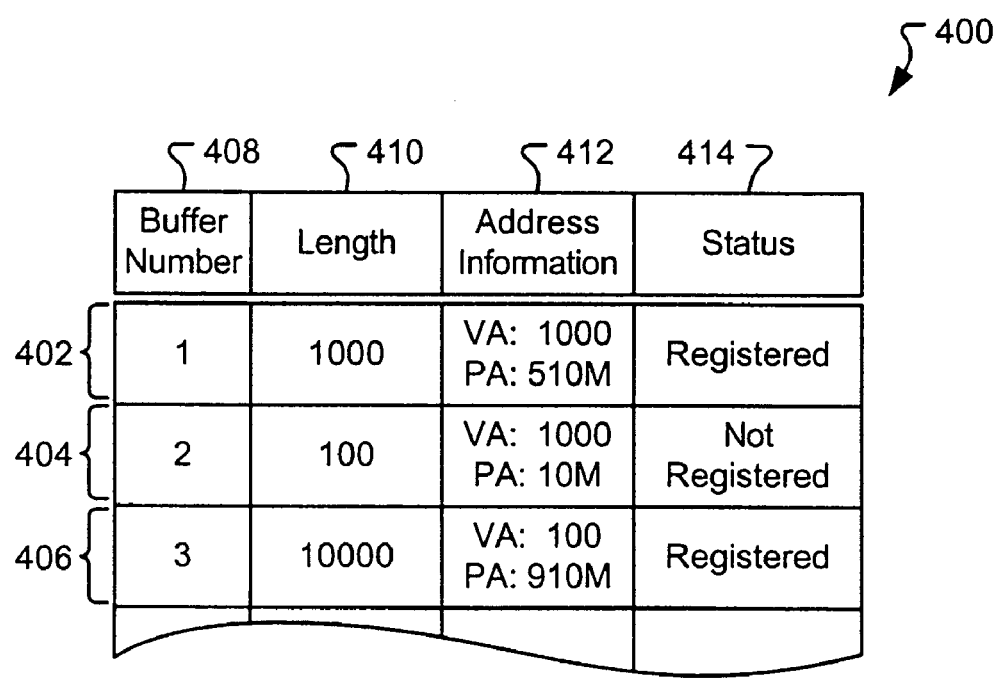
FIG. 4 illustrates a table of buffers maintained according to the present invention.

FIG. 4 illustrates a table 400 that may be maintained by the present invention including information related to the various buffers, such as buffers 402, 404 and 406. The buffers 402, 404 and 406 relate to portions of memory that have been set reserved or registered at one time by an application program, such as application 316 shown in FIG. 3. In an embodiment, the buffers 402, 404 and 406 each have an identification number, such as buffer number 408. This buffer number 408 may relate to an endpoint, socket or some other identification element. The buffers may further have other associated information, such as a length value 410, address information 412 for translating between virtual addresses to physical addresses and a status 414. The status of the buffer is important as to whether the buffer is registered or not. Of course, such a table may only maintain the list of registered buffers such that the column 414 is not necessary.

Figure 5:
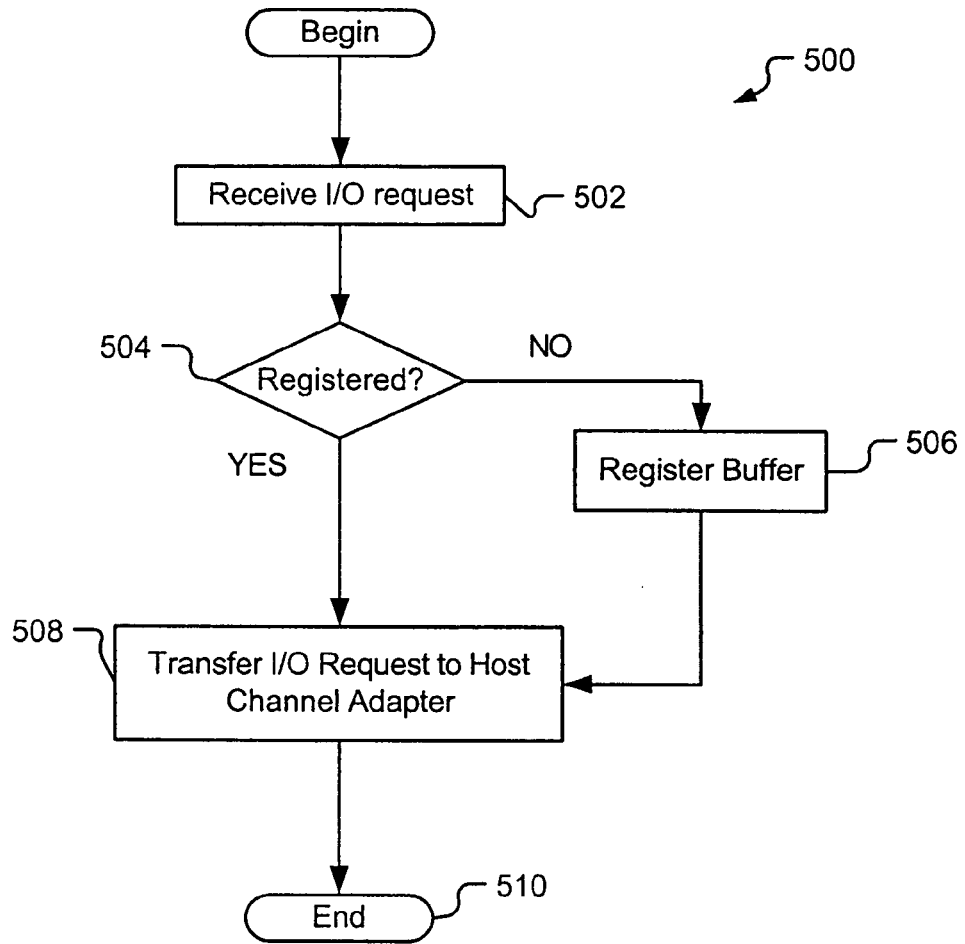
FIG. 5 is a flow diagram showing the operational characteristics performed by a memory management system in accordance with the present invention.

FIG. 5 illustrates the flow 500 of operations related to aspects of the present invention. The flow 500 of logical operations may be performed by the kernel interface module or another portion of code designed to intercept requests for I/O requests. In an embodiment, the flow 500 begins with receive operation 502, which receives the request for an I/O request. The request includes a request for a particular buffer, i.e., a buffer with a particular virtual address or endpoint and a length. The request may further have the associated information to be sent or received through the request.

Once the request for a buffer is received, determination operation 504 determines whether the requested buffer has been registered. In determining whether the buffer has been registered, operation 504 may analyze or compare the request information with that of a lookup table or other list that may indicate that such a buffer has been registered. For instance, the operation may analyze a table, such as the table 400 shown in FIG. 4. If the particular buffer information is found, then the operation may check status column 414 to determine whether the buffer is still registered. In alternative embodiments, the operation 504 determines registration by locating its presence in a table. In yet other embodiments, other methods may be use to maintain identification of registered buffers.

If determination operation 504 determines that the buffer is not registered, then flow branches NO to register buffer operation 506. Register buffer operation 506 registers the requested buffer. This operation may entail several operations, such as determining whether such address space exists, whether the information may be locked exclusively, whether other operations may try and swap this portion of memory, etc. Operation 506 may also place some sort of information within a table or provide some other indication that the buffer is registered.

Upon registering the buffer, transfer operation 508 transfers the I/O request to the host channel adapter by transferring the information from the request into the registered buffer. Similarly, if determination operation 504 determines that the buffer is already registered, then flow branches NO to transfer operation 508 to transfer the I/O request to the host channel adapter.

Following transfer operation 508, flow ends at end operation 510.

Figure 6:
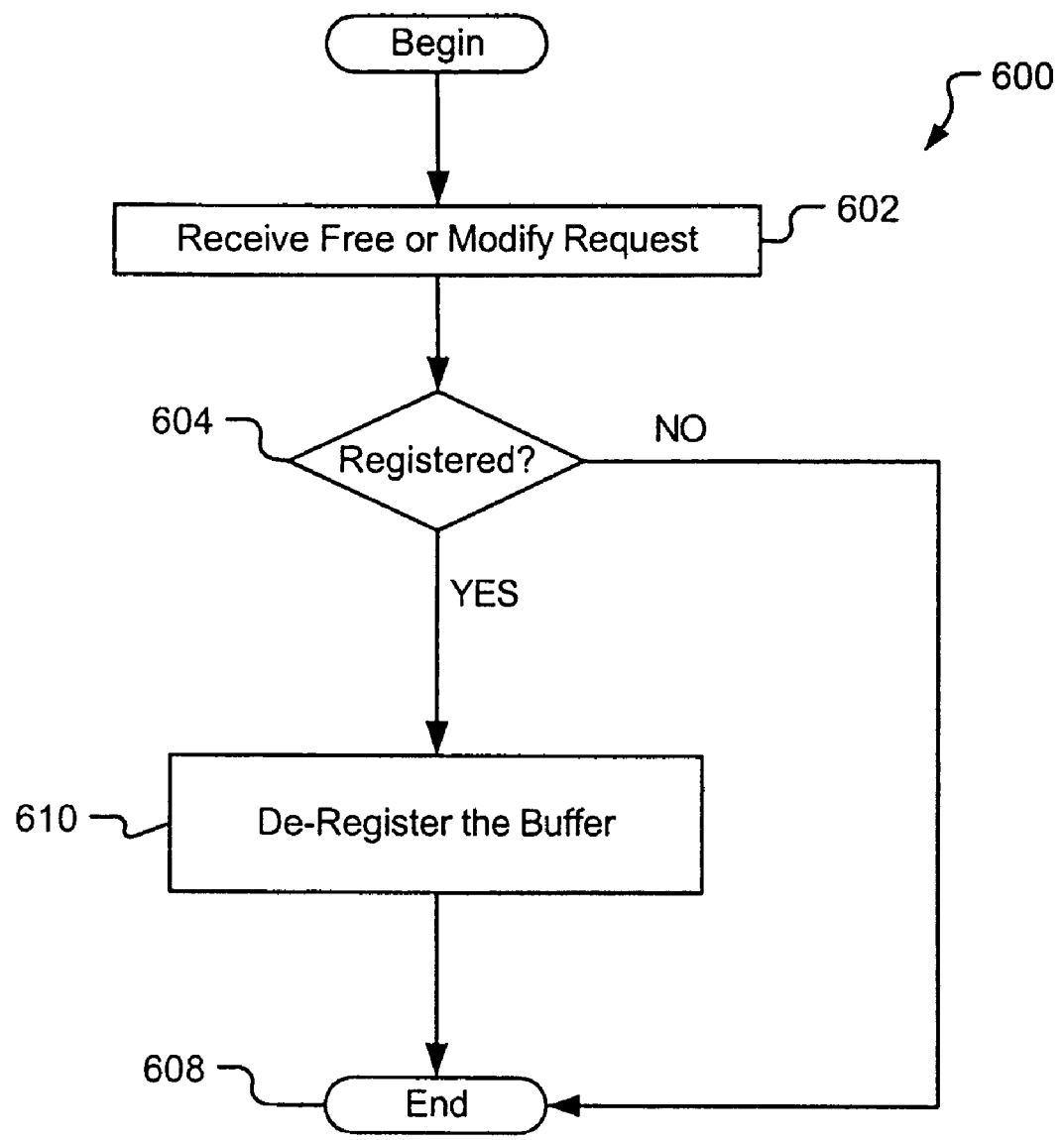
FIG. 6 is a flow diagram showing the operational characteristics performed by a memory management system in accordance with the present invention.

FIG. 6 illustrates the flow 600 of operations related to aspects of the present invention. In particular flow 600 relates to the maintenance of a list of registered buffers and especially removing buffers that are not in use so that the cache or memory allocated to the registered-buffer list can be simplified once buffer use is complete. The flow 600 of logical operations may be performed by the kernel interface module or another portion of code designed to intercept requests for I/O requests. In an embodiment, the flow 600 begins with receive operation 602, which receives a command or some other I/O request. The request includes either a command to free a buffer or to allocate/request another buffer. The request may further indicate a request to modify the properties of an existing buffer, such as the endpoint, length, etc.

Once the request to free or modify is received, determination operation 604 determines whether the buffer indicated in the buffer is registered. In determining whether the buffer is registered, operation 604 may analyze or compare the request information with that of a lookup table or other list that may indicate that such a buffer has been registered. For instance, the operation 604 may analyze a table, such as the table 400 shown in FIG. 4. If the particular buffer information is found, then the operation may check status column 414 to determine whether the buffer is still registered. In alternative embodiments, the operation 604 determines registration by locating its presence in a table. In yet other embodiments, other methods may be use to maintain identification of registered buffers.

If determination operation 604 determines that the buffer is not registered, then flow branches NO to end operation 606, ending flow 600. Essentially, if the request indicates that the registered buffer should be freed, and that buffer is not registered then nothing is to be done and the flow ends. Alternatively however, if the request is to modify an existing buffer, and the buffer is not registered, flow 600 ends, but another flow of operations may begin, such a registration flow of operations (not shown.)

If determination operation 604 determines that the buffer indicated in the request is registered, then flow branches YES to de-register operation 610. De-register operation 610 effectively de-registers the buffer by either modifying its status property in a lookup table, such as table 400 (FIG. 4) or by deleting the buffer from a list, or some other method of de-registering the buffer. Additionally, if the initial request indicated that some of the properties for a particular buffer should be modified, the de-registration operation 610 may either completely de-register the existing buffer and allow the registration of a new buffer, or modify the properties of the existing buffer. However, since most registration operations are fairly involved, the existing buffer is simply de-registered and the registration flow (not shown) can then proceed to register a new buffer having the new properties.

In this embodiment, the buffer is not de-registered until the application issues a command to either free the buffer or to change the permission attributes for the buffer. Thus, operation 604 intercepts such modifications to the memory and determines whether there is a registration table (or a module responsible for the registration table.) If so, the registration table is checked to determine whether the particular portion of memory is in the registration table, and if so, de-registers that buffer. Otherwise, if the buffer is not registered in the registration table, then essentially nothing happens.

Following de-registration operation 610, flow ends at end operation 606.

In an alternative embodiment, the buffers may not be de-registered without a specific request from the application that created the buffer indicating that the buffer should be free or modified. In such a case, a garbage collection system may be implemented to check the dates or uses of the registered buffers to determine whether stale buffers should remain registered. Such a system may be performed by the operating system or other module that maintains the list of registered buffers. The test used to determine whether the register is stale may involve a determination as to whether the application program that created the buffer is still active. Alternative embodiments may use other means to determine whether the existing, registered buffers should remain registered. If a determination is made that a registered buffer should be de-registered, then flow 600 may be implemented to de-register the buffer. Alternatively, the operation 608 may simply de-register the buffer.

The above described system and method provides the ability to maintain a registered buffer for more than one I/O request to thus reduce the overhead associated with the registration and de-registration process. Additionally, such a system may be implemented in a library routine, or other module as part of the operating system to allow applications that otherwise do not have such list-maintaining capabilities to take advantage of such a function.

Although the invention has been described in language specific to structural features, methodological acts, and computer readable media containing such acts, it is to be understood that the invention defined in the appended claims is not necessarily limited to the specific structure, acts or media described. Therefore, the specific structure, acts or media are disclosed as preferred forms of implementing the claimed invention.

What is claimed is:

1. A computer implemented method of managing memory in a distributed network, the method comprising:
   registering a buffer of memory in response to receipt of an input/output request from a client application program;
   allowing the client application program access to the registered buffer to perform the request;
   subsequent to performance of the request and in an absence of instruction from the client application program, maintaining the buffer as registered to allow the client application program to perform one or more subsequent requests using the registered buffer;
   receiving a request to free the buffer from the client application program, wherein the request to free the buffer is a request to modify the properties of the buffer to conform to a specified set of properties; and
   in response to receiving a request to modify the properties of the buffer to conform to a specified set of properties, de-registering the buffer and registering a new buffer that conforms to the specified set of properties.

2. A method as defined in claim 1, wherein the distributed network is a system area network.

3. A method as defined in claim 1, wherein the act of maintaining the buffer as registered comprises maintaining a list of registered buffers.

4. A method as defined in claim 3, wherein the list is a lookup table.

5. A method as defined in claim 1, wherein the act of de-registering the buffer is performed by an operating system.

6. A method as defined in claim 5, wherein the act of de-registering the buffer is not performed by the application program.

* * * * *